(12) United States Patent
Jain et al.

(10) Patent No.: US 11,695,874 B2
(45) Date of Patent: Jul. 4, 2023

(54) SYSTEM AND METHOD FOR INCREASED CALL QUALITY AND SUCCESS RATE

(71) Applicant: Google LLC, Mountain View, CA (US)

(72) Inventors: Arvind Jain, Los Altos, CA (US); Dylan Salisbury, Mountain View, CA (US); Alex Wiesen, Mountain View, CA (US); Matthew Reilly, Mountain View, CA (US); Anthony Jawad, Mountain View, CA (US); Tomas Lundqvist, Stockholm (SE)

(73) Assignee: Google LLC, Mountain View, CA (US)

( * ) Notice: Subject to any disclaimer, the term of this patent is extended or adjusted under 35 U.S.C. 154(b) by 41 days.

(21) Appl. No.: 16/657,205

(22) Filed: Oct. 18, 2019

(65) Prior Publication Data

US 2020/0053222 A1 Feb. 13, 2020

Related U.S. Application Data

(63) Continuation of application No. 14/140,913, filed on Dec. 26, 2013, now Pat. No. 10,491,749.
(Continued)

(51) Int. Cl.
*G06F 13/00* (2006.01)
*H04M 3/56* (2006.01)
(Continued)

(52) U.S. Cl.
CPC ........ *H04M 3/567* (2013.01); *H04L 65/1069* (2013.01); *H04L 65/4015* (2013.01); *H04L 65/61* (2022.05); *H04L 65/80* (2013.01)

(58) Field of Classification Search
CPC ............. H04L 65/4069; H04L 65/1069; H04L 65/4015; H04L 65/80; H04L 65/61; H04M 3/567
(Continued)

(56) References Cited

U.S. PATENT DOCUMENTS 6,128,490 A 10/2000 Shaheen et al.
6,381,315 B1 4/2002 Nhaissi
(Continued)

FOREIGN PATENT DOCUMENTS

CN 101009650 A 8/2007
CN 101018400 A 8/2007
(Continued)

OTHER PUBLICATIONS

Canadian Patent Office, Office Action dated Nov. 6, 2020 (Nov. 6, 2020), Application No. 2,925,109, 4 pages.
(Continued)

*Primary Examiner* — Kenneth R Coulter
(74) *Attorney, Agent, or Firm* — Shumaker & Sieffert, P.A.

(57) ABSTRACT

A system and method for providing a communication session is provided. The system and method include a client device in communication with a plurality of communication networks. The system and method further includes a server also in communication with the plurality of communication networks. The client device includes a network monitor module and a dialer module. The network monitor module determines which networks to utilize in the communication session, and the dialer module initiates and terminates the communication session. The server receives a data signal associated with the communication session from the selected communication network. The server places a separate call to the recipient client device and completes the connection from the client device to the recipient client device by sending the data signal over the phone call to the recipient client device.

20 Claims, 9 Drawing Sheets

Related U.S. Application Data

(60) Provisional application No. 61/883,644, filed on Sep. 27, 2013.

(51) Int. Cl.
*H04L 65/80* (2022.01)
*H04L 65/1069* (2022.01)
*H04L 65/401* (2022.01)
*H04L 65/61* (2022.01)

(58) Field of Classification Search
USPC ....... 709/227–229, 249, 250, 226, 235, 232, 709/230
See application file for complete search history.

(56) References Cited

U.S. PATENT DOCUMENTS

| | | | |
|---|---|---|---|
| 6,633,761 B1 | 10/2003 | Singhal et al. | |
| 7,180,898 B2 | 2/2007 | Yoshida et al. | |
| 7,433,929 B2 | 10/2008 | Guilford et al. | |
| 7,509,131 B2 | 3/2009 | Krumm et al. | |
| 7,724,753 B2 * | 5/2010 | Naqvi | H04M 7/123 370/410 |
| 7,809,360 B2 | 10/2010 | Agrawal et al. | |
| 7,848,292 B2 | 12/2010 | Bl et al. | |
| 8,107,932 B1 * | 1/2012 | Gentry | H04M 3/42153 455/414.1 |
| 8,131,317 B2 | 3/2012 | Lee | |
| 8,155,081 B1 | 4/2012 | Mater et al. | |
| 8,165,581 B2 | 4/2012 | Joshi et al. | |
| 8,200,217 B2 | 6/2012 | Kanade et al. | |
| 8,391,192 B2 | 3/2013 | Prakash et al. | |
| 8,433,298 B2 * | 4/2013 | Gentry | H04Q 3/0025 455/414.1 |
| 8,477,645 B2 | 7/2013 | Scherzer et al. | |
| 8,484,568 B2 | 7/2013 | Rados et al. | |
| 8,542,637 B2 | 9/2013 | Bandhakavi et al. | |
| 8,565,766 B2 | 10/2013 | Scherzer et al. | |
| 8,590,023 B2 | 11/2013 | Gupta et al. | |
| 8,824,327 B1 | 9/2014 | Basart et al. | |
| 9,351,203 B2 * | 5/2016 | Sidhu | H04M 7/1235 |
| 9,473,598 B2 * | 10/2016 | Kashyap | H04L 69/40 |
| 9,736,047 B2 * | 8/2017 | Chan | H04L 1/189 |
| 10,097,694 B1 | 10/2018 | Salisbury et al. | |
| 10,491,749 B2 * | 11/2019 | Jain | H04L 65/80 |
| 2001/0002192 A1 * | 5/2001 | Fujita | H04L 45/02 370/252 |
| 2002/0010866 A1 * | 1/2002 | McCullough | H04L 63/164 726/3 |
| 2002/0169716 A1 | 11/2002 | Johnson et al. | |
| 2004/0246920 A1 | 12/2004 | Savolainen | |
| 2005/0180338 A1 | 8/2005 | Pirila et al. | |
| 2005/0245269 A1 | 11/2005 | Demirhan et al. | |
| 2005/0276406 A1 | 12/2005 | Keohane et al. | |
| 2006/0098625 A1 | 5/2006 | King et al. | |
| 2006/0193295 A1 | 8/2006 | White et al. | |
| 2006/0291487 A1 * | 12/2006 | Naqvi | H04W 76/15 370/401 |
| 2006/0294244 A1 * | 12/2006 | Naqvi | H04L 67/146 709/227 |
| 2007/0037550 A1 | 2/2007 | Rassam | |
| 2007/0064684 A1 | 3/2007 | Kottilingal | |
| 2007/0064894 A1 | 3/2007 | Armstrong et al. | |
| 2007/0127391 A1 | 6/2007 | Goodman | |
| 2007/0147317 A1 | 6/2007 | Smith et al. | |
| 2008/0002668 A1 | 1/2008 | Asokan et al. | |
| 2008/0009279 A1 | 1/2008 | Sakawa | |
| 2008/0107051 A1 | 5/2008 | Chen | |
| 2008/0233977 A1 | 9/2008 | Xu et al. | |
| 2009/0061862 A1 | 3/2009 | Alberth, Jr. et al. | |
| 2009/0116443 A1 | 5/2009 | Walker et al. | |
| 2009/0157882 A1 * | 6/2009 | Kashyap | H04L 67/1034 709/227 |
| 2009/0168757 A1 | 7/2009 | Bush | |
| 2009/0201879 A1 | 8/2009 | Purkayastha et al. | |
| 2009/0298467 A1 | 12/2009 | Zohar | |
| 2010/0172323 A1 | 7/2010 | Rexhepi et al. | |
| 2010/0287296 A1 | 11/2010 | Riggert et al. | |
| 2010/0304737 A1 | 12/2010 | Jain et al. | |
| 2010/0310062 A1 | 12/2010 | Srinivasan et al. | |
| 2011/0096673 A1 | 4/2011 | Stevenson et al. | |
| 2011/0151871 A1 * | 6/2011 | Naqvi | H04L 12/2876 455/435.1 |
| 2011/0216694 A1 | 9/2011 | Plasberg et al. | |
| 2011/0250909 A1 | 10/2011 | Mathias et al. | |
| 2011/0269423 A1 | 11/2011 | Schell et al. | |
| 2011/0306318 A1 | 12/2011 | Rodgers et al. | |
| 2012/0014271 A1 | 1/2012 | Damenti | |
| 2012/0052914 A1 | 3/2012 | Yaqub et al. | |
| 2012/0083257 A1 * | 4/2012 | Gentry | H04M 3/42153 455/417 |
| 2012/0094653 A1 | 4/2012 | Okuda | |
| 2012/0108206 A1 | 5/2012 | Haggerty | |
| 2012/0178488 A1 | 7/2012 | Jonker et al. | |
| 2012/0195223 A1 | 8/2012 | Raleigh | |
| 2012/0282915 A1 | 11/2012 | Haynes et al. | |
| 2013/0165117 A1 | 1/2013 | Narayanan | |
| 2013/0040693 A1 | 2/2013 | Chen et al. | |
| 2013/0148567 A1 | 6/2013 | Efrati et al. | |
| 2013/0155842 A1 | 6/2013 | Moore et al. | |
| 2013/0196706 A1 | 8/2013 | Patel et al. | |
| 2013/0203438 A1 | 8/2013 | Shin | |
| 2013/0225169 A1 | 8/2013 | Farnsworth et al. | |
| 2013/0227647 A1 | 8/2013 | Thomas et al. | |
| 2013/0230023 A1 | 9/2013 | Gray et al. | |
| 2013/0242775 A1 | 9/2013 | Taylor | |
| 2013/0303156 A1 | 11/2013 | Astrom et al. | |
| 2014/0071895 A1 | 3/2014 | Bane et al. | |
| 2014/0080539 A1 | 3/2014 | Scherzer et al. | |
| 2014/0127992 A1 | 5/2014 | Kuscher et al. | |
| 2014/0148100 A1 | 5/2014 | Kim et al. | |
| 2014/0148170 A1 | 5/2014 | Damji et al. | |
| 2014/0211648 A1 | 7/2014 | Rahmati et al. | |
| 2014/0213256 A1 | 7/2014 | Meylan et al. | |
| 2015/0078332 A1 * | 3/2015 | Sidhu | H04M 7/1235 370/331 |
| 2015/0098393 A1 | 4/2015 | Tofighbakhsh et al. | |
| 2015/0127939 A1 | 5/2015 | Mazandarany et al. | |
| 2015/0141037 A1 | 5/2015 | Saha et al. | |
| 2015/0281198 A1 | 10/2015 | Lee et al. | |
| 2017/0111250 A1 * | 4/2017 | Chan | H04L 12/4641 |

FOREIGN PATENT DOCUMENTS

| | | |
|---|---|---|
| CN | 101420375 A | 4/2009 |
| CN | 102100112 A | 6/2011 |
| EP | 244501 A1 | 11/1987 |
| EP | 1885144 A2 | 2/2008 |
| EP | 3050351 B1 | 8/2019 |
| WO | 2002041580 A1 | 5/2002 |
| WO | 2004047476 A1 | 6/2004 |
| WO | 2006005947 A1 | 1/2006 |
| WO | 2011162688 A1 | 12/2011 |
| WO | 2013020598 A1 | 2/2013 |
| WO | 2013044359 A1 | 4/2013 |
| WO | 2014011094 A1 | 1/2014 |
| WO | 2015048439 A1 | 4/2015 |

OTHER PUBLICATIONS

"Circuit-switched fallback. The first phase of voice evolution for mobile LTE devices." Qualcomm Incorporated, 2012 (Applicant points out, in accordance with MPEP 609.04(a), that the year of publication, 2012, is sufficiently earlier than the effective U.S. filing date, so that the particular month of publication is not in issue.) 11 pages.

"Feature Requests—Republic Wireless Wiki," retrieved on May 2, 2014, http://republicwireless. wikia.com/wiki/Feature Requests 1 page.

"Republic Wireless," retrieved on Jan. 20, 2014, http://republicwireless.com 2 pages.

(56) References Cited

OTHER PUBLICATIONS

"What is Vol TE 1 Voice Over L TE 1 Tutorial," Retrieved from Apr. 7, 2014, Radio-Electronics. com, http://www.radio-electronics.com/info/cellulartelecomms/lte-long-termevolution/voice-over-lte-volte.php 5 pages.

"T-Mobile's 4G Network—Check Your Coverage—T-Mobile Blazing Fast 4G Coverage," 2014 (Applicant points out, in accordance with MPEP 609.04(a), that the year of publication, 2014, is sufficiently earlier than the effective U.S. filing date, so that the particular month of publication is not in issue.) 9 pages.

CMSG. "Reprogrammable SIMs: Technology, Evolution and Implications," Final Report (Sep. 25, 2012) (available at: http://stakeholders.ofcom.org.uk/binaries/research/telecomsresearch/reprogrammable-si ms. pdf).

DICODA.com. "Multi IMSI," Dicoda.com (Jun. 20, 2013) (available at: https://web.archive.org/web/20130620191315/http://www.dicoda.com/introduction/i msi).

Examination Report from counterpart European Application No. 14849102.0 dated Mar. 26, 2018, 6 pp.

Extended Search Report from counterpart European Application No. 14849102.0 dated Jul. 3, 2017, 12 pp.

Ge et al., "A History-Based Handover Prediction for L TE Systems" Computer Network and Multimedia Technology. CNMT. International Symposium on, vol. No., pp. 1 ,4, 18-20 (Jan. 2009).

Gemalto N.V. "Card Admin," Document Reference D1225357A (Jun. 2, 2011 ).

Higginbotham, Stacey. "Is Apple About to Cut Out the Carriers?" Gigaom.com (Oct. 27, 2010) (available at: http://gigaom.com/201 0/1 0/27/is-apple-about-to-cut-out-the-carriers/).

International Preliminary Report on Patentability from International Application No. PCT/US2014/057709, dated Mar. 29, 2016, 9 pp.

Korean Intellectual Property Office, International Search Report and the Written Opinion in International Application No. PCT/US2014/057709 Dec. 29, 2014.

Prosecution History from U.S. Appl. No. 14/140,913, dated Jan. 5, 2016 through Jul. 22, 2019, 135 pp.

Response to Office Action dated May 17, 2022, from counterpart Canadian Application No. 2,925,109 filed Aug. 12, 2022, 8 pp.

Tobias, Marc Weber. "The Split Personality Cell Phone That Saves You Money On Overseas Calling," Forbes.com (Aug. 20, 2013) (available at: http://onforb.es/14Q MCe4 ).

Office Action from counterpart Canadian Application No. 2,925,109 dated May 17, 2022, 5 pp.

Bircher et al., "An Agent-Based Architecture for Service Discovery and Negotiation in Wireless Networks," University of Bern, Wired/Wireless Internet Comms. (INWIC), Jan. 21, 2004.

Silverman, Dwight, "Thinking of changing cellphone carriers? Check this app first," <http://blog.chron.com/techblog/2011/06/thinki ng--0f-changing-cellphone-carriers-check-this-app-firsl/, Houston Chronicle Techblog, Jun. 15, 2011.

VoLGA Forum, "VoLGA Stage 2 V1.7.0: Voice over LTE via Generic Access," Jun. 14, 2010.

Qualcomm Europe et al., "Text Proposal for UE Measurements for Minimizing Drive Tests," 3GPP TSG-RAN I/VG2 Meeting #66, R2-093175, May 4-8, 2009.

Qualcomm Europe, "Framework for UE Son Reports," 3GPP TSG RAN WG3 & SA WG5, 85-090017, Jan. 12-13, 2008.

CMCC, "Network Selection for WLAN/3GPP Radio Interworking," 3GPP TSG-RAN WG2 Meeting 81#bis, R2-130973, Apr. 15-19, 2013.

International Search Report for the related Application No. PCT/uS2014/057709 dated Dec. 29, 2014.

First Office Action and Search Report, and translation thereof, from counterpart Chinese Application No. 201911086648.4 dated Jan. 5, 2023, 12 pp.

\* cited by examiner

SYSTEM AND METHOD FOR INCREASED CALL QUALITY AND SUCCESS RATE

CROSS-REFERENCE TO RELATED APPLICATIONS

This application is a continuation of, and claims priority under 35 U.S.C. § 120 from, U.S. patent application Ser. No. 14/140,913 now U.S. Pat. No. 10,491,749, filed on Dec. 26, 2013, which claims the benefit of U.S. Provisional Patent Application Ser. No. 61/883,644, filed on Sep. 27, 2013. The disclosures of these prior applications are considered part of the disclosure of this application and are hereby incorporated by reference in their entireties.

BACKGROUND

In mobile communications, the quality of a phone call such as a voice or video call is heavily affected by the signal reception associated with the network over which the communication is taking place. For example, often a signal from a cellular communications network will not propagate indoors and calls relying on the cellular signal will greatly degrade or even drop altogether.

Additionally, an already established phone call cannot be automatically changed to a video call even when a suitable data network for video calling is available. For example, a phone call taking place over a carrier network cannot be automatically moved to an available data network more suitable for a video call.

SUMMARY

One embodiment provides a method of communicating a data signal between a client device and a recipient client device. The method comprises monitoring signal quality of a plurality of network connections at a network monitor of the client device; selecting at least one network connection of the plurality of network connections based on a signal quality of the at least one network connection; initiating a communication session from a dialer of the client device over the at least one network connection of the plurality of network connections; relaying a data signal associated with the communication session to a server configured to receive data from the plurality of network connections; and completing the communication session to the recipient device from the server.

Another embodiment of the method provides initiating a second communication session from the dialer of the client device over a second network connection of the plurality of network connections; relaying both the data signal associated with the communication session and a data signal associated with the second communication session to the server; associating the data signal associated with the communication session and the data signal associated with the second communication session as both being based on a same input into the client device; organizing the data signal associated with the communication session and the data signal associated with the second communication session into a single data signal; and sending the single data signal from the server to the recipient device over a single communication session placed by the server to the recipient device.

Another embodiment includes a system for communication between a client device and a recipient device. The system comprises an input device; an output device; a network monitor configured to detect a signal strength of each of the plurality of communication networks; and a dialer configured to initiate or terminate at least one communication session based on the signal strength detected by the network monitor; and a server configured to receive a data signal related to the at least one communication session from the client device and initiate a communication session from the server to the recipient device based on data received from the client device.

Yet another embodiment includes a method of maintaining a phone call between a client device and a recipient device. The method comprises receiving an at least one voice stream at a server from a dialer application operating on a client device over an at least one network connection; determining, by the server, a destination of the at least one voice stream based on a phone number of the recipient device; and placing a phone call from the server to the recipient device based on the phone number.

Another embodiment includes a server configured as a central service conducting a communication session and configured to coordinate the signaling of the communication session. The server comprises an at least one processor; a network interface configured to communicatively couple the server to a plurality of communication networks including at least one carrier network and at least one data network; a media mixing module running a media mixing service configured to coordinate a signaling path between a plurality of client devices, the coordination of the signaling path includes maintaining a phone call from each of the plurality of client devices to the media mixing service and joining the phone call from each of the plurality of client devices into a communication session sharing data between each of the plurality of client devices; a media session data joining module running a data joining service, the data joining service is configured to move an individual phone call from an individual client device of the plurality of client devices to the at least one data network; and a connection number module running a connection service, the connection service is configured to move the individual phone call of the individual client device of the plurality of client devices to the at least one carrier network.

Yet another embodiment includes a method of providing a communication session. Coordination of the signaling for the communication session is performed by a server running a central service. The method comprises receiving a first data signal from a first client device at a media mixing module of the server, the data signal contains media data from the first client device and an identifier of a second client device; conducting a first phone call between the first client device and the media mixing module of the server based on the first data signal received from the first client device; initiating a second phone call from the media mixing module of the server to the second client device based on the identifier contained in the data signal from the first client device; connecting the second client device to the media mixing module of the server over the second phone call receiving a second data signal from the second client device at the media mixing module of the server, the second data signal contains media data from the second client device; and joining the first data signal of the first client device and the second data signal of the second client device in a media mixing communication session.

Another embodiment includes a non-transitory computer readable storage device for providing a media mixing communication session between a plurality of client devices. The computer readable storage device having computer executable instructions for performing the steps of receiving a first data signal from a first client device at a media mixing module of a server interposed between each of the plurality of client devices, the data signal contains media data from the first client device and an identifier of a second client device; conducting a first phone call between the first client device and the media mixing module of the server based on the first data signal received from the first client device; initiating a second phone call from the media mixing module of the server to the second client device based on the identifier contained in the data signal from the first client device; connecting the second client device to the media mixing module of the server over the second phone call receiving a second data signal from the second client device at the media mixing module of the server, the second data signal contains media data from the second client device; and joining the first data signal of the first client device and the second data signal of the second client device in a media mixing communication session.

DETAILED DESCRIPTION

In mobile communications, the quality of a phone call such as a voice or video call is heavily affected by the signal reception associated with the network over which the communication is taking place. For example, often a signal from a Wide Area Network (WAN) such as a cellular communications carrier network will not propagate indoors and calls relying on the cellular signal will greatly degrade or even drop altogether. The inverse can be true as well, in that a Voice of Internet Protocol (VoIP) call placed over a Wireless Local Area Network (WLAN) or data network such as a Wi-Fi network may experience a degraded signal or even drop when a caller moves outdoors and away from the WLAN.

Additionally, during an ongoing call it may be desirable to switch from a carrier network to a data network or from a data network to a carrier network. For example, a phone call originally initiated to share audio data may at some point during the phone call decide to switch to a video call. Because of the increased data demand involved with a video call, it may be desirable to switch to another available network more suitable for transmitting a video call.

Therefore, a system that allows a caller to move between networks while maintaining both quality and the overall success rate of a phone call is desired. One such system is one that makes use of signals from both a WAN and WLAN when available together in order to improve network quality. In this exemplary embodiment, a caller may complete a phone call to a callee through a proxy service that tracks the phone call and will resume the call if it is dropped due to issues with the network or a switch to a video call is requested.

Figure 1:
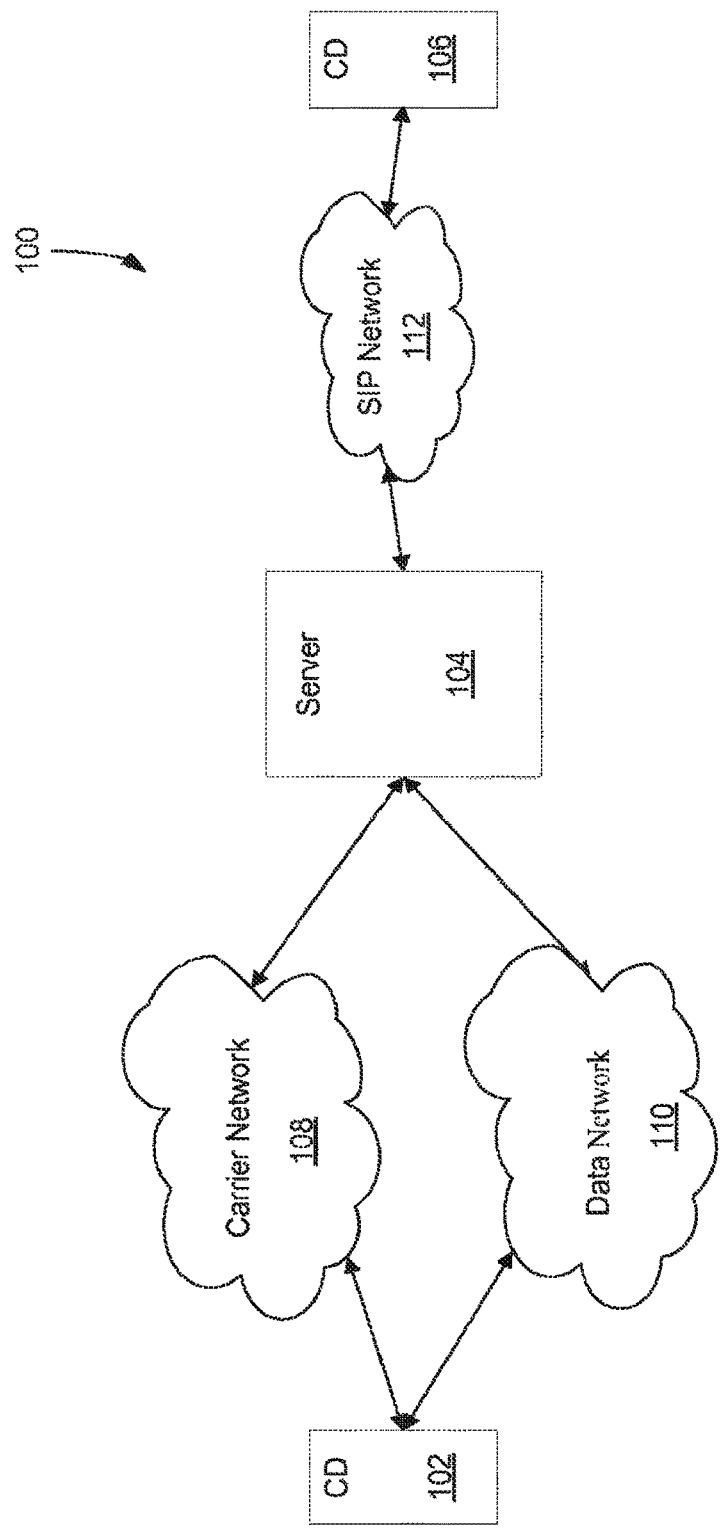
FIG. 1 is a block diagram illustrating a system for providing increased call quality, according to an example embodiment.

FIG. 1 illustrates a block diagram of a communication system 100 in which various embodiments of the present disclosure may be implemented. In the system 100, a client device 102 is connected to a server 104 through a plurality of communication networks, which are depicted in FIG. 1 as carrier network 108 and data network 110. In turn, the server 104 communicates with a second client device 106 through another communication network in the form of a Session Initiation Protocol (SIP) network 112. In this manner, a communication session such as a phone call can be conducted between the initiating client device 102 and the recipient client device 106.

As an aside, while only three communication networks 108, 110 and 112 are illustrated, in other embodiments, more are contemplated. Further, even though only client devices 102 and 106 are illustrated, more are contemplated, as embodiments of the disclosure are capable of coordinating a communication session between a plurality of participants. Even further, SIP network 112 could be replaced with more than one network similar to carrier network 108 and data network 110. For ease of description the dynamics between the client device 102 and carrier network 108 and data network 110 will generally be described in relation to client device 102; however, similar functionality may be included with client device 106.

The client devices 102 and 106 may be a mobile device such as a smart phone, a tablet computer, a laptop computer, a watch with a computer operating system, a personal digital assistant (PDA), a video game console, a wearable or embedded digital device(s), or any one of a number of additional devices with wireless communications capability.

Furthermore, communication networks 108 and 110 are generally wireless networks. Example networks include but are not limited to Wide Area Networks (WAN) such as a Long Term Evolution (LTE) network, a Global System for Mobile Communications (GSM) network, a Code Division Multiple Access (CDMA) network, a Wideband Code Division Multiple Access (WCDMA), Wireless Local Area Networks (WLAN) such as the various IEEE 802.11 standards, or any other kind of carrier and data networks. The communication networks 108 and 110 allow the client device 102 to communicate with the server 104. For example, client device 102 may transmit information to the server 104 and receive information from the server 104. For instance, communication networks 108 and 110 may each separately include a set of cell towers, as well as a set of base stations and/or mobile switching centers (MSCs) communicating over a cellular carrier Public Switch Telephone Network (PSTN). In some embodiments, the communication networks 108 and 110 may include various cell tower/base station/MSC arrangements over a cellular data network.

In the exemplary embodiment illustrated in FIG. 1, carrier network 108 is a WAN such as a cellular carrier network providing network access over a 2G, 3G, or 4G network, such as GSM, WCDMA, or LTE, respectively, communicating over either a PSTN or data network. And data network 110 is a WLAN data network operating under one of the IEEE 802.11 standards. In this exemplary embodiment, coverage for the carrier network 108 may degrade as client device 102 enters a building. However, wireless coverage inside the building may be adequate over data network 110. Therefore, client device 102 will have constant wireless access when transitioning between good and bad coverage for both carrier network 108 and data network 110.

In the exemplary embodiment illustrated in FIG. 1, server 104 is configured to receive and transmit a voice data signal, such as that associated with a Voice over Internet Protocol (VoIP) call or a carrier network voice call, between client device 102 and client device 106 through the various networks 108, 110 and 112. Therefore, a caller using client device 102 may place a phone call to client device 106 through server 104. In this scenario, client device 102 connects to one of the carrier network 108, the data network 110, or both simultaneously to relay a data signal associated with the phone call to the server 104. Server 104 then places a phone call to client device 106 over SIP network 112. Server 104 knows to call the client device 106 by using information identifying client device 106 sent in the data signal associated with the phone call.

While in the exemplary embodiment server 104 transmits and receives voice data, server 104 may be configured to handle any type of data such as multimedia data including audio, video, pictures, and text data and share that data among the participants in the communication session.

Figure 2:
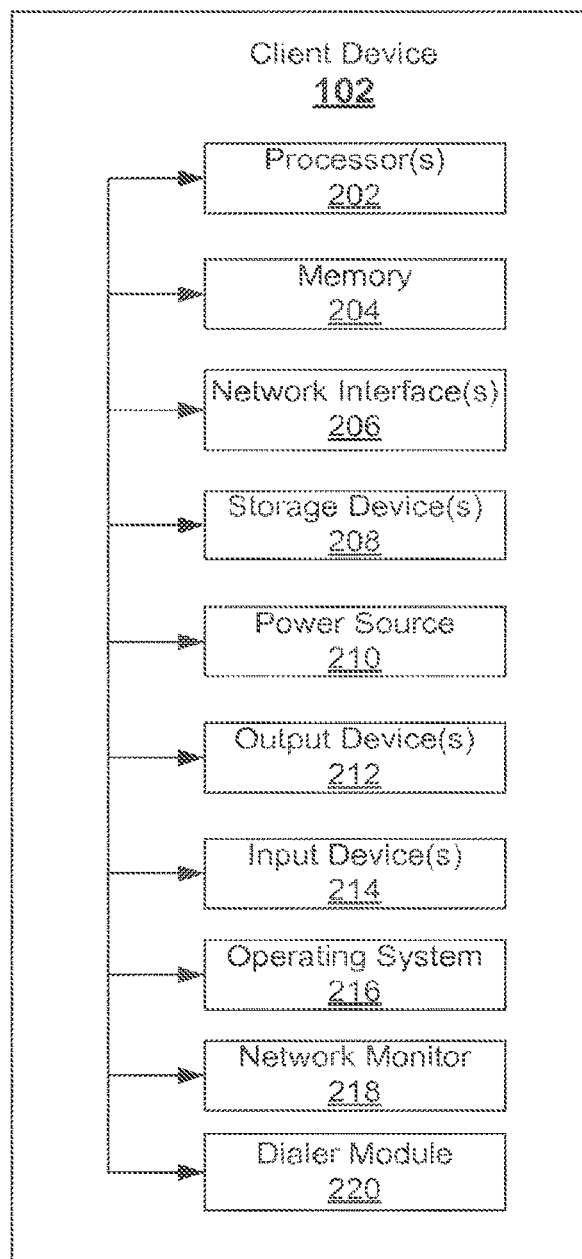
FIG. 2 is a block diagram illustrating components of a client device of FIG. 1, according to one embodiment.

Turning now to FIG. 2, a block diagram of basic functional components for the client device 102 of FIG. 1, according to one aspect of the disclosure, is illustrated.

In general, many other embodiments of the client device 102 may be used. In the illustrated embodiment of FIG. 2, the client device 102 includes one or more processors 202, memory 204, a network interface(s) 206, one or more storage devices 208, power source 210, one or more output devices 212, one or more input devices 214, a network monitor 218, and a dialer module 220. The client device 102 also includes an operating system 216. Each of the components including the processor 202, memory 204, network interface 206, storage device 208, power source 210, output device 212, input device 214, network monitor 218, dialer module 220 and the operating system 216 are interconnected physically, communicatively, and/or operatively for inter-component communications.

As an aside, client device 106 may be equipped with similar functionality. For ease of description, the functionality will be described in relation to client device 102, but in certain embodiments client device 106 is equipped with similar functionality.

As illustrated, processor 202 is configured to implement functionality and/or process instructions for execution within client device 102. For example, processor 202 executes instructions stored in memory 202 or instructions stored on a storage device 204. Memory 202, which may be a non-transient, computer-readable storage medium, is configured to store information within client device 102 during operation. In some embodiments, memory 202 includes a temporary memory, an area for information not to be maintained when the client device 102 is turned off. Examples of such temporary memory include volatile memories such as random access memories (RAM), dynamic random access memories (DRAM), and static random access memories (SRAM). Memory 202 also maintains program instructions for execution by the processor 202.

Storage device 204 also includes one or more non-transient computer-readable storage media. The storage device 204 is generally configured to store larger amounts of information than memory 202. The storage device 204 may further be configured for long-term storage of information.

In some examples, the storage device 204 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 102 uses network interface(s) 206 to communicate with external devices via one or more networks, such as the communication networks 108 and 110 of FIG. 1. Network interface(s) 206 may be a network interface card, such as an Ethernet card, an optical transceiver, a radio frequency transceiver, or any other type of device that can send and receive information. Other non-limiting examples of network interfaces include Bluetooth®, 2G, 3G, 4G and Wi-Fi radios in client computing devices, and USB.

The client device 102 includes one or more input devices 214. Input devices 214 are configured to receive input from a user or a surrounding environment of the user through tactile, audio, and/or video feedback. Non-limiting examples of input device 214 include a presence-sensitive screen, a mouse, a keyboard, a voice responsive system, video camera, microphone or any other type of input device. In some examples, a presence-sensitive screen includes a touch-sensitive screen.

One or more output devices 212 are also included in client device 102. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The client device 102 includes one or more power sources 210 to provide power to the device. Non-limiting examples of power source 210 include single-use power sources, rechargeable power sources, and/or power sources developed from nickel-cadmium, lithium-ion, or other suitable material.

The client device 102 includes an operating system 216. The operating system 216 controls operations of the components of the client device 102. For example, the operating system 216 facilitates the interaction of the processor(s) 202, memory 204, network interface 206, storage device(s) 208, input device 214, output device 212, power source 210, network monitor 218 and dialer module 220.

In certain embodiments of the disclosure, the client device 102 further includes a network monitor module 218. The network monitor module 218 keeps track of the signal quality of the various wireless communication networks connected to the client device 102 through the network interface(s) 206. In the exemplary embodiment of FIG. 1, the network monitor module 218 would monitor the available signal quality from the carrier network 108 and the data network 110.

In the exemplary embodiment of FIG. 1, the network monitor module 218 would track whether the signal quality was decreasing or increasing for both networks 108 and 110. Based on the detected signal quality, the network monitor module 218 informs the client device 102 whether a phone call should be initiated over carrier network 108 or data network 110. For example, the network monitor module 218 may decide that only the carrier network 108 needs to be used for a phone call because its signal quality is adequate. However, if the signal quality of the carrier network 108 drops, which can be detected generally based on signal strength when a voice call is not active or by actually tracking the performance of the voice call, the network monitor module 218 may determine to use the data network 110 in addition to the carrier network 108. If the phone call is then determined to be operating adequately over the data network 110 and the location of the client device 102 is relatively stable, then the network monitor module 218 may determine to only use the data network 110 and terminate the call over the carrier network 108.

In certain embodiments, the network monitor module 218 may decide to use one of the carrier network 108 or data network 110 based on the increased signal strength of that network. For instance, if client device 102 is already connected over the data network 110 but the network monitor module 218 notices an increase in signal quality from carrier network 108, the network monitor module 218 may instruct the client device 102 to connect over the carrier network 108 even though no degradation of the data network 110 has occurred.

In certain embodiments, the network monitor module 218 may have access to information regarding the historical performance of the carrier network 108 or data network 110 within the current geographic area in which the client device 102 may be located. In this embodiment, the network monitor module 218 may decide to connect to one of the carrier network 108 or data network 110 based on this expected signal quality of the respective networks.

Accordingly, as discussed above, while a phone call is ongoing, the network monitor module 218 continues to track the signal quality of networks 108 and 110. In this manner, the network monitor module 218 can determine whether the signal quality of the network currently in use is increasing or decreasing and whether a suitable or even preferable alternative network exists based on the actual signal quality or expected signal quality of the alternative networks and the current network.

Additionally, when the network monitor module 218 is monitoring a cellular network, such as that in the exemplary embodiment discussed above, the network monitor module 218 may collect further information pertaining to both the PSTN and a data network associated with the carrier network 108. Based on the further information collected regarding the carrier network 108, the network monitor module 218 will make a recommendation on whether a phone call should be placed over the cellular carrier PSTN or whether the phone call should be placed over the data network using an Internet Protocol (IP) based communication scheme such as the VoIP.

In certain embodiments, an additional function of the network monitor module 218 is to determine whether the communication network(s) currently being used can support High Definition (HD) voice or video. Conducting a phone call using HD voice or video requires higher bandwidth than a typical voice call. Therefore, the network monitor module 218 provides an indication of whether a communication network(s) is capable of supporting HD voice or video such that a call can be either be initiated or upgraded to HD voice or a video call.

In certain embodiments of the disclosure, the client device 102 further includes a dialer module 220. The dialer module 220 uses the network recommendation from the network monitor module 218 to place a phone call over either network 108 or 110.

Using the previously discussed exemplary embodiment illustrated in FIG. 1, when a phone call is initiated the network monitor module 218 may have advised to use the carrier network 108. In this case, the dialer module 220 would place the phone call over the carrier network 108 and may further decide to use either the voice channel over the PSTN to make a regular phone call or it may use a cellular data channel to make a VoIP call, as determined by the network monitor module 218.

Subsequently, in a situation where the network monitor module 218 detects degradation in the signal quality from the carrier network 108 currently supporting the phone call or an increase in the signal quality of the data network 110, a suggestion to use the data network 110 in addition to the carrier network 108 may be made. In this scenario, the dialer module 220 places a second phone call over the data network 110 to the same recipient of the original phone call. The second phone call is a VoIP call based on the same input into the client device 102 as the original phone call. Based on advice from the network monitor module 218, the dialer module 220 may determine that the data network 110 is stable enough such that the second phone call may be maintained solely by the data network 110 and drop the original phone call over the carrier network 108. Alternatively, the network monitor module 218 may determine that the signal quality of the carrier network 108 has improved and therefore the second call over the data network 110 may be dropped.

Accordingly, based on the advice from the network monitor module 218, the dialer module 220 will instruct the client device 102 to be in one of three calling conditions. The first condition is a phone call over a single communication network such as carrier network 108 or data network 110. The second condition is two separate phone calls with one phone call over a first network such as the carrier network 108 and the other phone call over a second network such as the data network 110. The third condition is a transition from two active phone calls to a single phone call over whichever network (carrier network 108 or data network 110) the network monitor module 218 determines is most suitable for the phone call.

Figure 3:
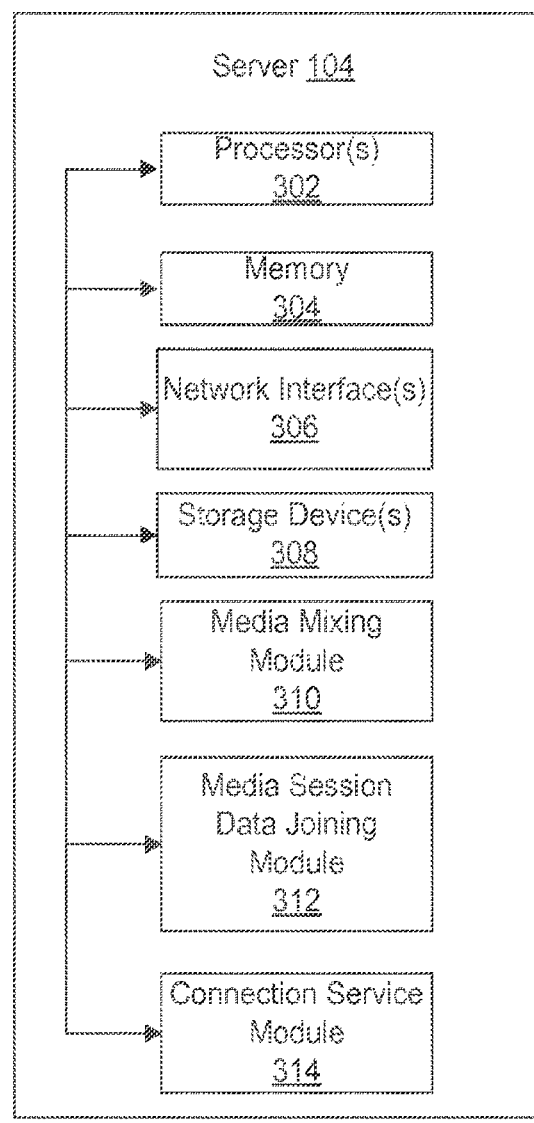
FIG. 3 is a block diagram illustrating a server of FIG. 1, according to one embodiment.

Turning now to FIG. 3, a block diagram of basic functional components for a server 104 is depicted, according to one aspect of the disclosure. Server 104 runs a central service interposed in the signaling paths of inbound and outbound phone calls from and to client devices, such as client device 102 and client device 106 (see FIG. 1). The server 104 includes one or more processors 302, memory 304, network interface(s) 306, one or more storage devices 308, a media mixing module 310, a media session data joining module 312, and a connection service module 314. In some embodiments, each of the components including the processor(s) 302, memory 304, network interface(s) 306, storage device(s) 308, media mixing module 310, media session data joining module 312, and connection service module 314 are interconnected physically, communicatively, and/or operatively for inter-component communications.

As illustrated, processors 302 are configured to implement functionality and/or process instructions for execution within the server 104. For example, processors 302 execute instructions stored in memory 304 or instructions stored on storage devices 308. Memory 304, which may be a non-transient, computer-readable storage medium, is configured to store information within server 104 during operation. In some embodiments, memory 304 includes a temporary memory, i.e. an area for information not to be maintained when the server 104 is turned off. Examples of such temporary memory include volatile memories such as random access memories (RAM), dynamic random access memories (DRAM), and static random access memories (SRAM). Memory 304 also maintains program instructions for execution by the processors 302.

Storage devices 308 also include one or more non-transient computer-readable storage media. Storage devices 308 are generally configured to store larger amounts of information than memory 304. Storage devices 308 may further be configured for long-term storage of information. In some examples, storage devices 304 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The server 104 uses network interface(s) 306 to communicate with external devices via one or more networks, such as the carrier network 108 or the data network 110 of FIG. 1. Such networks may also include one or more wireless networks, wired networks, fiber optics networks, and other types of networks through which communication between the server 104 and an external device may be established. Network interface(s) 306 may be a network interface card, such as an Ethernet card, an optical transceiver, a radio frequency transceiver, or any other type of device that can send and receive information.

The server 104 includes the media mixing module 310, which runs a media mixing service that coordinates the signaling from a plurality of client devices participating in a communication session via server 104. The media mixing service is a central service receiving individual data signals from each of the plurality of client devices, such as client devices 102 and 106 (see FIG. 1), participating in a communication session through server 104. The media mixing service then mixes the data signals received from each of the plurality of client devices such that the media transmitted over the data signals is shared among the plurality of client devices.

In the embodiment illustrated in FIG. 1, client device 102 and client device 106 each transmit a data signal containing media to be shared in the communication session. The media mixing module 310 receives the data signals from each of client device 102 and client device 106 and relays the media contained in the data signals to the recipient device. The media may be audio, video, text, or images. Also, while only client device 102 and client device 106 are illustrated in FIG. 1, the media mixing module 310 is capable of operating with more than two client devices participating in a communication session.

Additionally, the media mixing module 310 is capable of controlling system resources of the server 104 such that for low data rate communication sessions only a minimal amount of system resources are utilized. For example, if there are only two participants in a communication session, and the media transmitted in the data signals from each of the two participants is audio data, then the media mixing module 310 will instruct the server 104 to utilize a minimal amount of system resources. During the communication session between the two participants, if the media switches to video or several additional participants join the communication session, then the media mixing module 310 will instruct the server 104 to use more system resources to support the communication session.

The server 104 includes a media session data joining module 312, which runs a data joining service. The data joining service operates in conjunction with the media mixing service to allow a client device participating in a communication session (such as client devices 102 and 106 from FIG. 1) to locate and join the communication session over a data network, such as data network 110. For example, if client device 102 (see FIG. 1) is participating in the communication session over the carrier network 108 and during the communication session indicates to the server 104 that it wants to communicate over data network 110, the data joining service facilitates client device 102 placing a redundant phone call over the data network 110. The same data signal is transmitted from client device 102 over both the carrier network 108 and the data network 110.

The data joining service utilizes a variety of techniques to facilitate placement of a redundant phone call over the data network 110. One such technique is to send a message containing an identifier of the communication session to a client device, such as client device 102, after receiving indication that the client device 102 is switching networks, as discussed above in relation to FIG. 2. Client device 102 then places the redundant phone call over the data network, such as data network 110, to the server 104, which then joins the phone call to the communication session. Once the redundant phone call is joined to the communication session, the client device 102 may make the decision to terminate the original phone call, as discussed above. This message may be implemented using a mobile push notification service.

A second technique used to facilitate placement of a redundant phone call from a client device, such as client device 102, participating in a communication session through the server 104 is a network Application Programming Interface (API) provided by the data joining service. The API is configured to provide an identifier of the communication session to the client device 102 upon query from the client device 102. The API knows determines the identifier based on a query of the client device's 102 call currently in progress. The client device 102 then utilizes the identifier to locate and join the communication session over a redundant phone call. Once the redundant phone call is joined to the communication session, the client device 102 may make the decision to terminate the original phone call.

The server 104 includes a connection module 314, which runs a connection service. The connection service operates in conjunction with the media mixing service of the media mixing module 310 to allow a client device participating in a communication session (such as client devices 102 and 106 from FIG. 1) to locate and join the communication session over a carrier network, such as carrier network 108. For example, if client device 102 (see FIG. 1) is participating in the communication session over the data network 110 and during the communication session indicates to the server 104 that it wants to communicate over carrier network 108, the connection service facilitates client device 102 placing a redundant phone call over the carrier network 108. The same data signal is transmitted from client device 102 over both the carrier network 108 and the data network 110.

The connection service utilizes a variety of techniques to facilitate placement of a redundant phone call over the carrier network 108. One such technique is to send a message containing a connection phone number for the communication session to a client device, such as client device 102. The client device 102 then places the redundant phone call over the carrier network 108 to the server 104 using the connection phone number, which then joins the phone call to the communication session. Once the redundant phone call is joined to the communication session, the client device 102 may make the decision to terminate the original phone call. This message may be implemented using a mobile push notification service.

A second technique used to facilitate placement of a redundant phone call from a client device, such as client device 102, participating in a communication session through the server 104 is a number request via a phone call to a controlled phone number of the server 104. The controlled phone number calls the media mixing service of the media mixing module 310 directly, and the media mixing service instructs the connection service to provide a phone number for the ongoing communication session. The client device calls the phone number provided by the connection service over the carrier network 108 in order to locate and join the communication session through a redundant phone call. Once the redundant phone call is joined to the communication session, the client device 102 may make the decision to terminate the original phone call.

In a particular embodiment, a client device, such as client device 102, is able to place a redundant phone call over a carrier network, such as carrier network 108, to the server 104 without utilizing the connection service. In this embodiment, the client device 102 is preprogrammed with at least one phone number that calls the media mixing module 310 of server 104 directly. When the media mixing module 310 receives a phone call over this preprogrammed number it reads the caller identification information to determine whether client device 102 is currently participating in a communication session. The media mixing module then connects the redundant phone call to the communication session. Once the redundant phone call is joined to the communication session, the client device 102 may make the decision to terminate the original phone call.

The server 104 depicted in FIG. 3 is representative of a physical embodiment of a server. However, the server 104 may be implemented as a virtual server such as a cloud server.

Server 104 is configured to receive a data signal associated with a phone call placed from client devices, such as client devices 102 and 106 (see FIG. 1) over a communication network via outbound call interception techniques. In the specific embodiment illustrated in FIG. 1, the server 104 is configured to receive the data signal from either a carrier network 108 or a data network 110, but in other embodiments, more than two networks are contemplated.

One such technique used by server 104 for outbound call interception is shadow number calling. Shadow number calling requires the dialer module 220 to call a reserved shadow phone number that connects directly to the media mixing module 310 of server 104 instead of the number entered by the user. The dialer module 220 then provides the user entered number of the recipient client device, such as client device 106 and the client device's 102 own phone number to the media mixing module 310. The media mixing module 310 then places a separate phone call to the recipient client device 106 and then joins the two phone calls into a communication session.

Another technique used by server 104 for outbound call interception is network integration. Using this technique, both the carrier network 108 and the data network 110 know when it receives an initiation request for a phone call from the dialer module 220 of client device 102 to relay the data signal associated with the phone call to the media mixing module 310 of server 104. The media mixing module 310 then places a phone call to the recipient client device 106 and joins the two phone calls into a communication session. The media mixing module 310 uses identification information in the data signal to place a phone call to the recipient client device 108 (see FIG. 1). In the embodiment illustrated in FIG. 1, this phone call is a VoIP phone call over SIP network 112. After placing the phone call, the media mixing module 310 then completes the communication session by sending the data signal associated with the phone call from client device 102 over the VoIP phone call to the recipient client device 106.

Server 104 is further configured to receive a data signal associated with a phone call placed to the client device 102 (see FIG. 1) over a communication network via inbound call interception techniques. In the specific embodiment illustrated in FIG. 1, the server 104 is configured to receive the data signal from either a carrier network 108 or a data network 110, but in other embodiments, more than two networks are contemplated.

One such technique used by server 104 for inbound call interception is service number calling. Service number calling requires a user provide a service number as a primary point of contact. The service number calls the media mixing module 310 of server 104 directly as opposed to the user's associated client device. The media mixing module 310 knows the user associated with the service number and places a separate phone call to the user's associated client device, such as client device 102. The media mixing module 310 then joins the two phone calls into a communication session.

As an aside, the media mixing module 310 can call more than one device associated with the user based on the service number. In this manner, the user can be reached via multiple points of contact.

Another technique used by server 104 for inbound call interception is network integration. Using this technique, both the carrier network 108 and the data network 110 know when it receives an initiation request for a phone call to client device 102 to relay the data signal associated with the phone call to the media mixing module 310 of server 104 rather than directly to client device 102. The media mixing module 310 then places a phone call to client device 102 and joins the two phone calls into a communication session.

As an aside, in other embodiments, other types of phone calls besides a VoIP call over a variety of different types of networks besides an SIP network 112, both data and voice based, are contemplated. Additionally, the above described outbound and inbound interception techniques are utilized when the user dials a phone number to reach a remote party. Embodiments of the disclosure are contemplated where the media mixing module 310 of server 104 controls the signaling between a plurality of client devices involved in a communication session such as a multi-party video conference, which is not initiated by dialing a phone number. In this situation, the plurality of client devices join the conference directly through the server 104 and the media mixing module 310 controls the signaling therebetween. In this manner, there is no need for an outbound or inbound interception technique because no phone number is being dialed by the client device.

Furthermore, in the situation where the dialer module 220 places two simultaneous phone calls from the client device 102, both data signals (original and redundant) associated with the phone calls will be relayed to the media mixing module 310 of the server 104. The media mixing module 310 will realize that both data signals are from the same client device and should be directed to the same recipient device 106 based on identification information in the data signals such as a phone number associated with the recipient client device 106. In this configuration, the media mixing module 310 uses both data signals associated with the phone calls to synthesize a best quality data signal, which it then sends to the recipient client device 106 over the separate phone call established when the original phone call was first initiated.

Several techniques can be used to synthesize the best quality data signal to the recipient client device 106. One technique the media mixing module 310 uses to synthesize a best quality data signal relies on the two separate data signals carrying the same data because they are associated with the same input into the client device 102. Specifically, to synthesize the best quality data signal the media mixing module 310 will merely send the data signal that is received at the server 104 first and discard the other.

Another technique to produce a best quality data signal is for the dialer module 220 to split the data signal based on the singular input into the client device 102 and send part of the data over each communication network, such as the carrier network 108 and the data network 110. Splitting the data signal is advantageous because it increases the bandwidth available for the data signal. This may be done in situations where the network monitor module 218 notices stable signal quality from both the carrier network 108 and the data network 110. In this scenario, the media mixing module 310 must know how the dialer module 220 is splitting the data among the two networks 108 and 110 such that it can reconstruct the data signal and send it to the recipient client device 106.

While there are many possibilities on how to split the data, one method is to use a scalable coding technique where the data signal is split into a base layer and a high quality incremental layer. In this embodiment, the base layer of the data signal would be sent over one network and the incremental layer would be sent over the other network. Another technique to split the data signal is to send alternate packets over each network connection. For example, a first packet of the data signal could be sent over the carrier network 108 and a second packet could be sent over the data network 110.

Regarding a data signal received at the media mixing module 310 from the recipient client device 106, the media mixing module 310 is configured to transmit this data signal back to the client device 102 over whichever network connection is active. Specifically, in the scenario where only a single communication network such as the carrier network 108 is active, the media mixing module 310 will send the data signal received from the recipient device 106 to the client device 102 over the carrier network 108. In the situation where both the carrier network 108 and the data network 110 are active, the media mixing module 310 will reproduce the data signal received from the recipient client device 106 and send over both communication networks 108 and 110. Client device 102 will then receive the same data signal over each of the carrier network 108 connection and the data network 110 connection. The client device 102 will reproduce the singular data signal from the recipient client device 106 by utilizing whichever packet is received first and discarding the redundant packet from the other network.

In this manner, the connection between the client device 102 and the recipient client device 106 can be maintained even when switching between the communications networks 108 and 110. This is because no matter whether the connection to the client device 102 is over the carrier network 108 or the data network 110, the media mixing module 310 will maintain the call to the recipient client device 106 and just complete the communication over whichever communication network 108 or 110 the client device 102 is currently communicating with.

Furthermore, because the server 104 is an intermediary entity between the client device 102 and the recipient client device 106, if the client device 102 is connected over the carrier network 108 and the call from the client device 102 to the server 104 drops, the media mixing module 310 of server 104 will be able to tell whether the recipient client device 106 hung up or whether the network inadvertently dropped the call. The media mixing module 310 can make this determination because if it is a carrier network 108 failure that causes the call to end, then the connection from the server 104 to the recipient client device 106 would still be active. Otherwise, if the recipient client device 106 hung up, the connection to the server 104 would no longer be active. In the event that a network failure is detected, the dialer module 220 of the client device 102 will reestablish the connection to the server 104, and the server 104 will just resume the connection as it was before the network failure.

Figure 4:
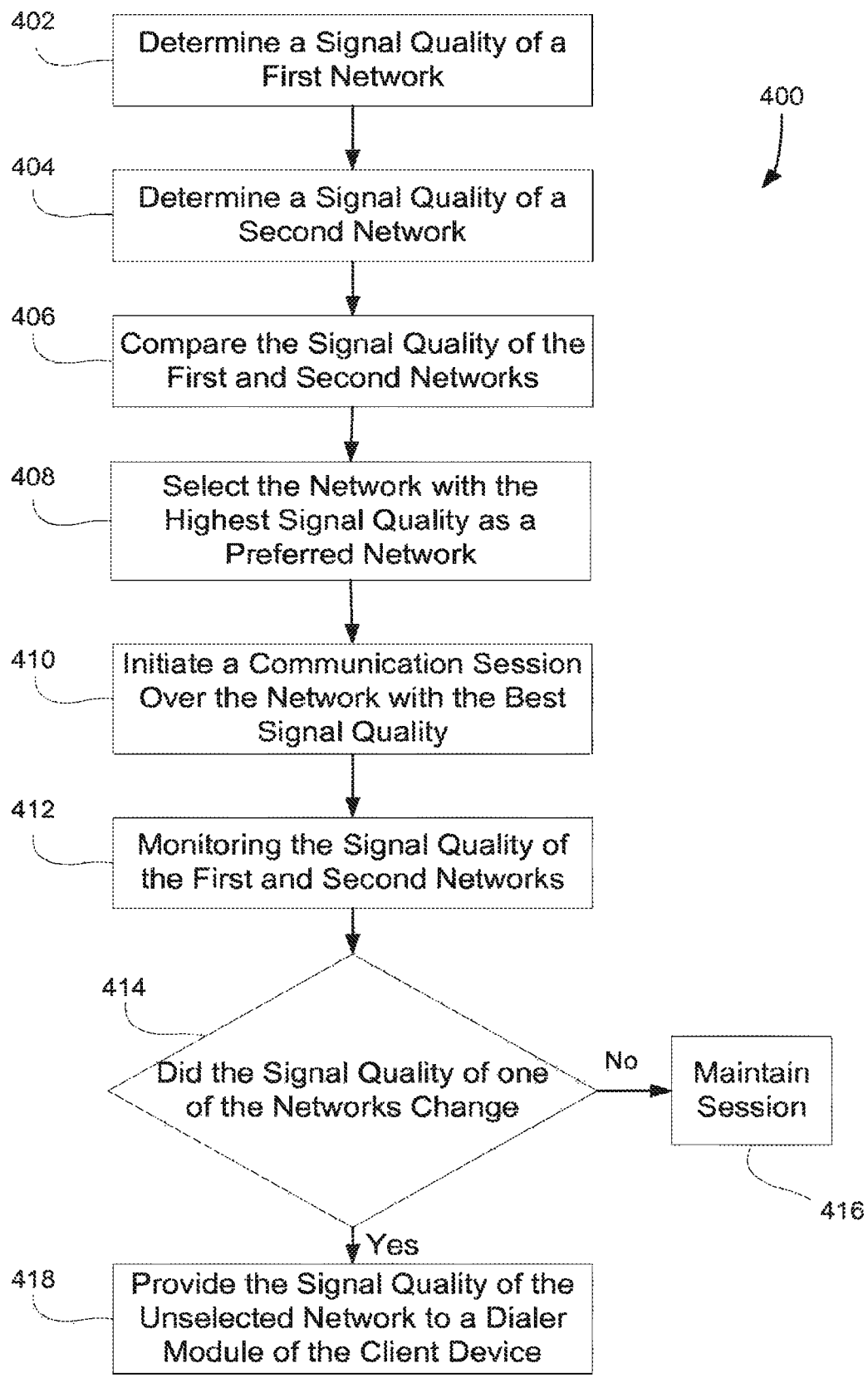
FIG. 4 is a flow diagram associated with a network monitor of the client device from FIG. 2, according to one embodiment.

Turning now to FIGS. 4-9, flow charts are illustrated that disclose an exemplary embodiment of the disclosure contained herein. FIG. 4 illustrates a flow chart 400 depicting steps performed by the network monitor module 218 (see FIG. 2) in conjunction with the dialer module 220. At steps 402 and 404, the network monitor module 218 will determine the signal quality of first and second network connections (such as communication networks 108 and 110 from FIG. 1). At step 406, the network monitor module 218 compares the signal quality of the first and second network connections and selects the network connection with the highest signal quality at step 408. At step 410, the dialer module 220 initiates a communication session or in other words a phone call to the server 104 over the selected network connection. While the phone call is underway, the network monitor module 218 continues to monitor the signal quality of the network connections at step 412. At step 414, the network monitor module 218 determines whether the signal quality of the selected network connection had degraded such that placing a call over the alternative network is advised or that the signal quality of the alternative network has increased such that the alternative network is advised. If the connection has not degraded or the signal quality of the alternative network has not increased, then the dialer module 220 will just maintain the phone call at step 416. However, if the signal quality of the selected network has degraded or the alternative network signal quality has increased, then the network monitor module 218 will provide a signal quality of the unselected network connection to the dialer module 220.

Figure 5:
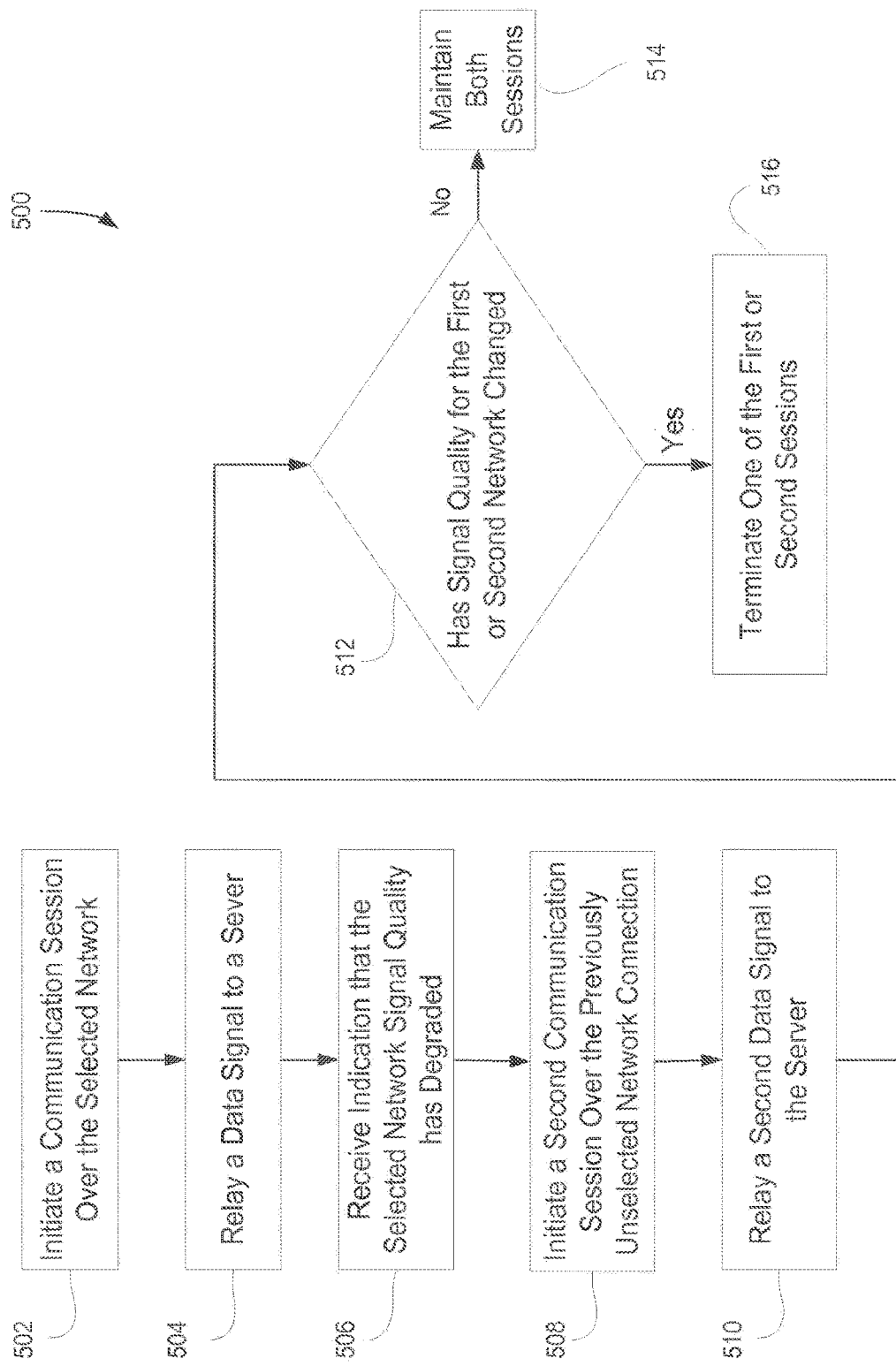
FIG. 5 is a flow diagram associated with a dialer of the client device from FIG. 2, according to one embodiment.

Flow chart 500 illustrated in FIG. 5 depicts the steps performed by the dialer module 220 (see FIG. 2) based on advice from the network monitor module 218. At step 502, the dialer module 220 initiates a communication session or phone call over the selected network, similar to step 410 of FIG. 4. At step 504, the dialer module 220 relays a data signal associated with the initiated phone call to the server 104. At step 506, the dialer module 220 receives indication that the signal quality of the selected network connection has degraded or the signal quality of an alternative or unselected network has increased. At step 508, the dialer module 220 initiates a second communication session or in other words a second phone call over the previously unselected network. At step 510, the dialer module 220 relays a second data signal associated with the second phone call to the server 104 (see FIG. 1). At step 512, the network monitor 218 determines whether the signal quality of one of the network connections has changed such that it will advise to terminate one of the connections. For instance, the signal quality of one network has improved greatly and the signal quality of the other network has degraded significantly. Or the signal quality of just one network has degraded significantly. If the signal quality of both the networks is adequate, then both phone calls are maintained at step 514. However, if the signal quality of at least one of the networks has changed such that termination is recommended, the dialer module 220 terminates the phone call associated with that network at step 516.

Figure 6:
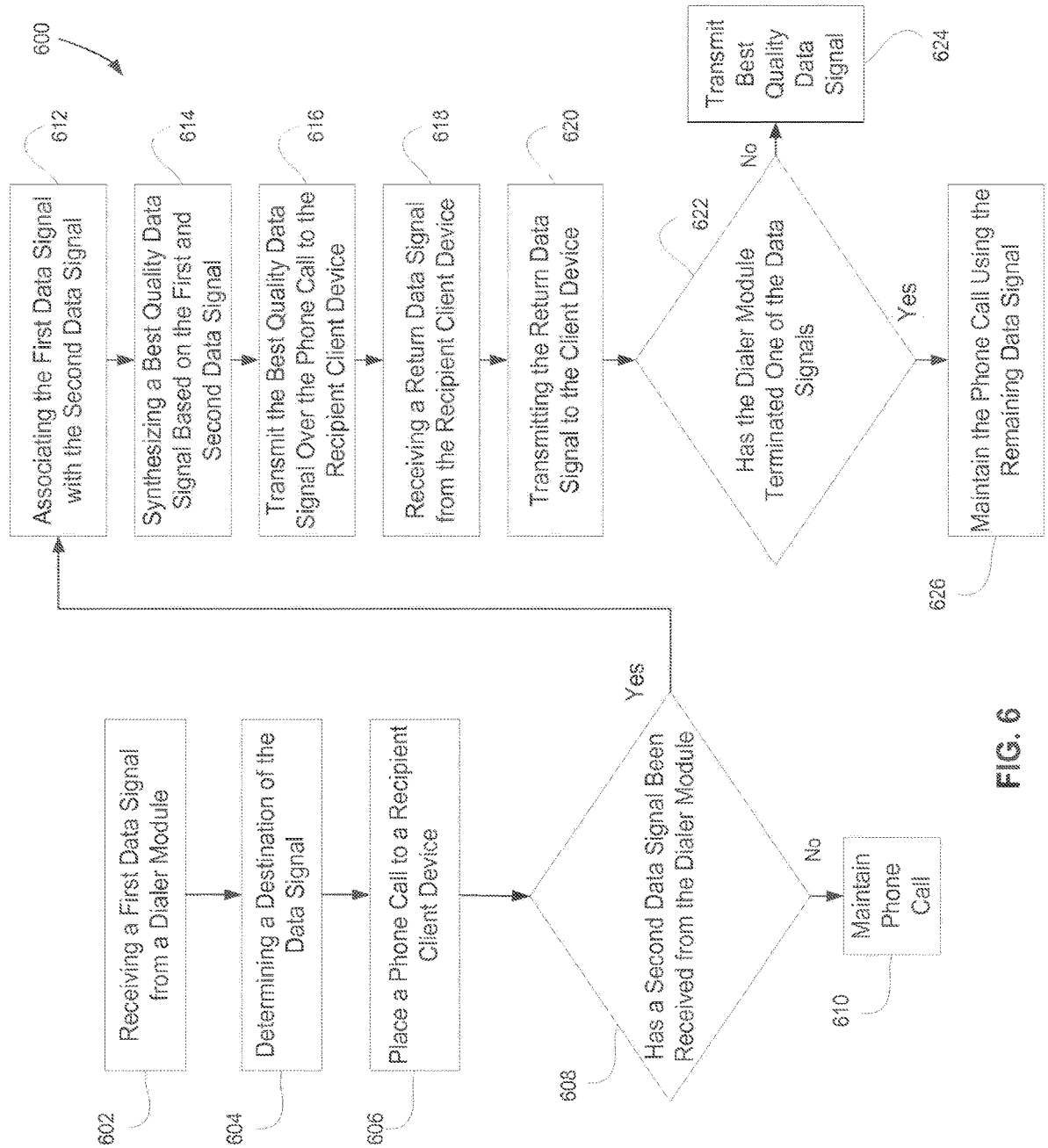
FIG. 6 is a flow diagram associated with the server from FIG. 3, according to one embodiment.

Flow chart 600 illustrated in FIG. 6 depicts the steps performed by the server 104 (see FIG. 1) based on receiving a data signal or data signals from the dialer module 220 (see FIG. 2) of the client device 102. At step 602, the server 104 receives a first data signal from the dialer module 220. At step 604, using identification information contained in the data signal, the server 104 determines a destination for the data signal, such as recipient client device 106. At step 606, the server 104 places a phone call to the determined destination or in other words, the recipient client device 106 and joins the call from the client device 102 to the call to the recipient client device 106. At step 608, the server 104 checks to see if a second data signal has been received from the dialer module 220. If not, then the server 104 maintains the communication session between the client device 102 and the recipient client device 106. If a second data signal has been received from the dialer module 220, then, at step 612, the server 104 associates the first data signal with the second data signal. At step 614, the server 104 synthesizes a best quality voice stream based on the received first and second data signals. At step 616, the server 104 transmits the best quality data signal over the phone call to the recipient client device 106. At step 618, the server 104 receives a return data signal from the recipient client device 106. At step 620, the server 104 transmits a data signal from the recipient client device 106 over both the first and second networks to the client device 102. At step 622, the server 104 checks if the dialer module 220 has terminated one of the phone calls associated with one of the data signals. If no such termination has occurred, then at step 624 the server 104 maintains the communication session between the client device 102 and the recipient client device 106 utilizing both the first and second data signals to synthesize a best quality data signal to send to the recipient client device 106. If the dialer module 220 has terminated one of the data signals from the client device 102, then at step 626 the server 104 maintains the communication session between the client device 102 and the recipient client device 106 using only the remaining data signal from the client device 102.

Figure 7:
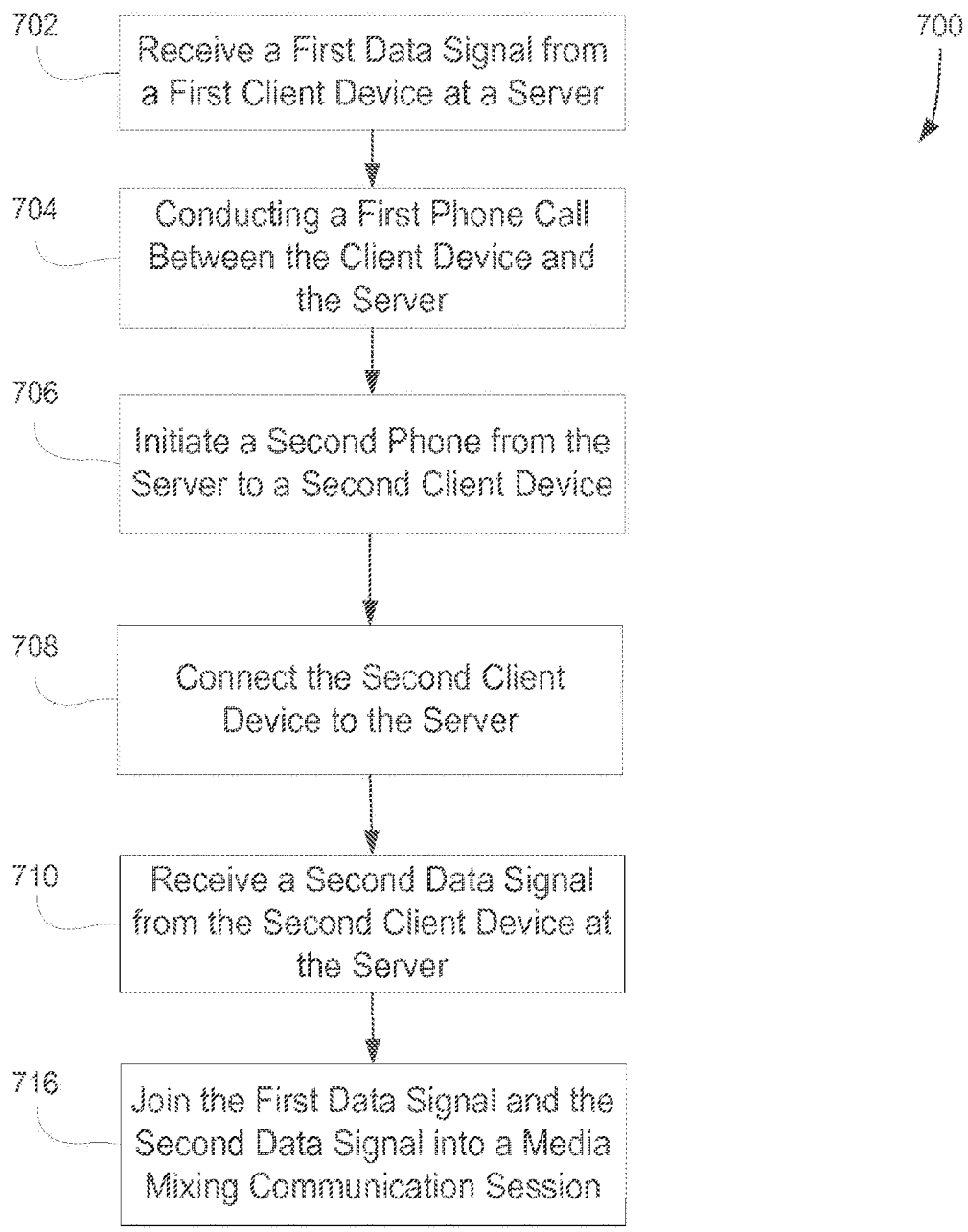
FIG. 7 is a flow diagram associated with the server from FIG. 3, according to one embodiment.

Flow chart 700 illustrated in FIG. 7 depicts the steps performed by the server 104 (see FIG. 1) based on receiving a data signal from the dialer module 220 (see FIG. 2) of the client device 102. Flow chart 700 is similar to flow chart 600 (see FIG. 6) but contains more specificity regarding operation of the media mixing module 310. At step 702, the server 104 receives a first data signal from client device 102 at a media mixing module 310 of the server. The data signal contains media data from client device 102 and an identifier of a recipient client device, such as client device 106. At step 704, the server 104 conducts a first phone call between client device 102 and the media mixing module 310 of the server 104 based on the first data signal received from the client device 102. At step 706, the media mixing module 310 initiates a second phone call from the media mixing module 310 of the server 104 to the recipient client device 106 based on the identifier contained in the data signal from client device 102. At step 708, the media mixing module 310 connects the recipient client device 106 to the media mixing module of the server over the second phone call. At step 710, server 104 receives a second data signal from the recipient client device 106 at the media mixing module 310 of the server 104. The second data signal contains media data from the second client device. At step 712, the media mixing module 310 joins the first data signal from client device 102 and the second data signal from the recipient client device 106 in a media mixing communication session. In this manner, the media mixing module 310 coordinates the media contained in the first and second data signals between client device 102 and client device 106.

Figure 8:
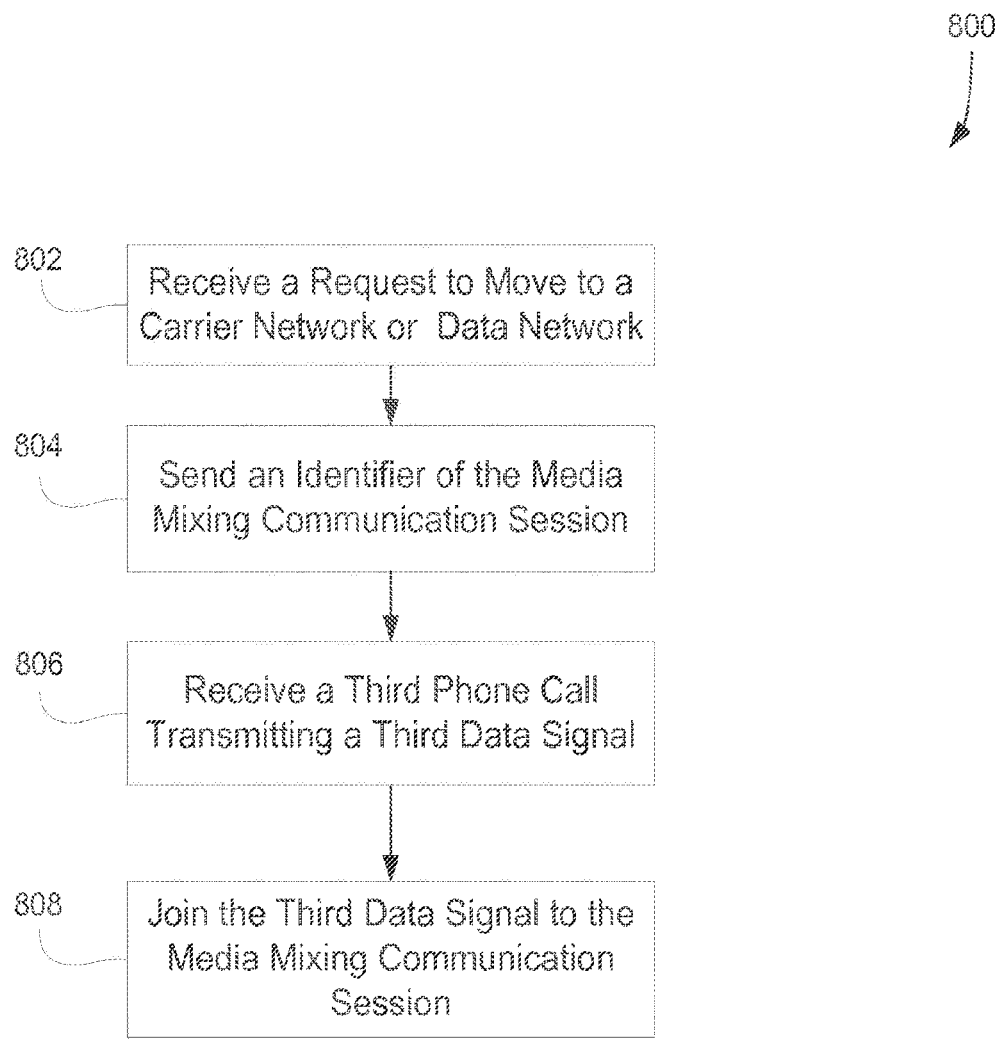
FIG. 8 is a flow diagram associated with moving a phone call coordinated by the server of FIG. 3 to either a carrier network or a data network.

Flow chart 800 illustrated in FIG. 8 depicts the steps performed by the server 104 (see FIG. 1) based on receiving an indication of a request to move at least one of the first data signal or second data signal (see FIG. 7) to one of the carrier network 108 or the data network 110 (see FIG. 1). Flow chart 800 is similar to flow chart 500 (see FIG. 5), but flow chart 800 illustrates the steps taken from the perspective of the modules running on server 104. At step 802, the media mixing module 310 of the server 104 receives a request to move to either carrier network 108 or data network 110 from either or both of the client device 102 or the client device 106. At step 804, the media mixing module 310 sends an identifier of the ongoing media mixing communication session (see FIG. 7) to the client device that sent the request to move. At step 806, the media mixing module 310 receives a third phone call transmitting a third data signal redundant to the data signal from the client device that sent the request to move over either the carrier network or the data network.

As an aside, the choice of whether to move to the carrier network or the data network is performed by the client device, such as client device 102. As discussed above, the client device 102 will make this decision based on network quality and capacity for the desired data to be shared during the communication session. If client device 102 requests to move to the data network 110, then the media session data joining module 312 (see FIG. 3) is utilized to assist in the move. And if the client device 102 requests to move to the carrier network 108, then the connection service module 314 (see FIG. 3) is utilized to assist in the move.

Returning to flow chart 800, at step 808, the media mixing module 310 joins the third data signal to the media mixing communication session over either the carrier network or the data network, as requested by client device 102. At this point, using the system illustrated in FIG. 1, the third data signal is redundant to either the first or second data signals, depending on which client device (either client device 102 or 106) decided to move. As described in FIG. 5 above, the client device 102 or 106 then decides whether to maintain both transmitted data signals or to terminate one of the data signals.

Figure 9:
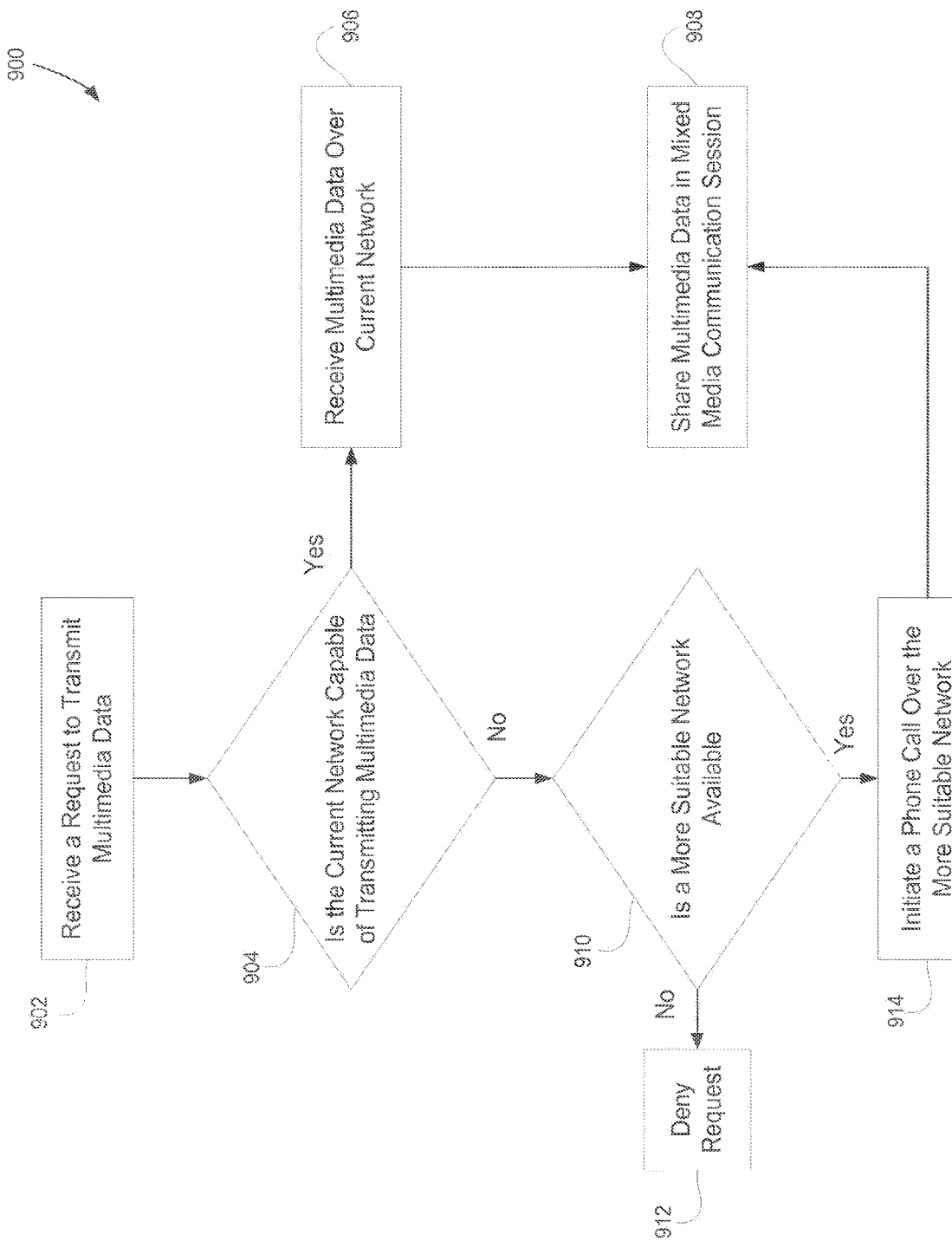
FIG. 9 is a flow diagram associated with initiating a multimedia video call utilizing the server of FIG. 3.

Flow chart 900 illustrated in FIG. 9 depicts the steps performed by the media mixing module 310 of the server 104 (see FIG. 1) based on receiving a request to change an ongoing communication session to a multimedia communication session, such as a video call. At step 902, the media mixing module 310 receives a request to switch from an audio data based communication session to a multimedia data based communication session, such as a video call. At step 904, the media mixing module 310 receives an indication of whether the network the client device is currently communicating over is capable of transmitting multimedia data such as video data. If the current network is capable, then the media mixing module 310 will receive the multimedia data from the client device, at step 906, and then proceed to share the multimedia data with other client devices associated with the communication session at step 908. If the current network is not capable of transmitting multimedia data, then the client device checks if a more suitable network is available. If a more suitable network is not available, then the request to transmit multimedia data is denied at step 912. If a more suitable network is available, then a request to move to the more suitable network is performed at step 914. Moving to a new network is performed as described in FIG. 8. After the client device is joined to the communication session over the more suitable network for transmitting multimedia data, then the media mixing module 310 of server 104 shares the multimedia data over the media mixing communication session at step 908. In this manner, the media mixing module 310 coordinates the signaling between each participating client device in the media mixing communication session.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of the disclosure (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   receiving, simultaneously, at a server:
   from a client device via a first network, a first part of a data stream over a first network connection of a plurality of network connections; and
   from the client device via a second network, a second part of the data stream over a second network connection of the plurality of network connections, the second part of the data stream and the first part of the data stream comprising different parts of a same data signal obtained at the client device;
   reconstructing, by the server, from the first part of the data stream over the first network connection and the second part of the data stream over the second network connection, the same data signal as a single data stream, wherein a data rate of the single data stream is greater than a bandwidth provided by the first network connection alone or a bandwidth provided by the second network connection alone;
   sending, by the server, the single data stream to a recipient device;
   receiving, at the server, a return data stream from the recipient device; and
   transmitting, by the server, the return data stream over both the first network connection and the second network connection to the client device.

2. The method of claim 1, further comprising:
   determining, by the server, that the first network connection has been terminated by the client device; and
   maintaining, by the server, the single data stream using the second part of the data stream received over the second network connection.

3. The method of claim 1, wherein at least one of the first network connection or the second network connection communicates with a carrier Public Switched Telephone Network (PSTN), and the carrier PSTN associates the server with the client device.

4. The method of claim 1, wherein at least one of the first network connection or the second network connection communicates with a Wi-Fi network, and the server directly communicates with the client device over the Wi-Fi network.

5. The method of claim 1, further comprising associating, by the server, the first part of the data stream with the second part of the data stream based on a phone number received at the server from the client device, the phone number associated with the recipient device.

6. The method of claim 1, further comprising calling, by the server, the recipient device at a phone number received from the client device.

7. The method of claim 6, wherein the step of calling is performed over a carrier Public Switched Telephone Network (PSTN) to a Session Initiation Protocol (SIP) network.

8. The method of claim 1, wherein the first part of the data stream contains voice data associated with a phone call between the client device and the recipient device.

9. The method of claim 8, further comprising upgrading, by the server, the voice data to contain High Definition (HD) voice data based on a signal quality of at least one of the first network connection or the second network connection.

10. The method of claim 8, further comprising upgrading, by the server, the phone call to a video call based on a signal quality of at least one of the first network connection or the second network connection.

11. A system comprising:
    data processing hardware; and
    memory hardware in communication with the data processing hardware, the memory hardware storing instructions that when executed on the data processing hardware cause the data processing hardware to perform operations comprising:
    receiving, simultaneously:

from a client device via a first network, a first part of a data stream over a first network connection of a plurality of network connections; and from the client device via a second network, a second part of the data stream over a second network connection of the plurality of network connections, the second part of the data stream and the first part of the data stream comprising different parts of a same data signal obtained at the client device;

reconstructing from the first part of the data stream over the first network connection and the second part of the data stream over the second network connection, the same data signal as a single data stream, wherein a data rate of the single data stream is greater than a bandwidth provided by the first network connection alone or a bandwidth provided by the second network connection alone;

sending the single data stream to a recipient device;

receiving a return data stream from the recipient device; and transmitting the return data stream over both the first network connection and the second network connection to the client device.

12. The system of claim 11, wherein the operations further comprise:

determining that the first network connection has been terminated by the client device; and maintaining the single data stream using the second part of the data stream received over the second network connection.

13. The system of claim 11, wherein at least one of the first network connection or the second network connection communicates with a carrier Public Switched Telephone Network (PSTN), and the carrier PSTN associates a server with the client device.

14. The system of claim 11, wherein at least one of the first network connection or the second network connection communicates with a Wi-Fi network, and a server directly communicates with the client device over the Wi-Fi network.

15. The system of claim 11, wherein the operations further comprise associating the first part of the data stream with the second part of the data stream based on a phone number received from the client device, the phone number associated with the recipient device.

16. The system of claim 11, wherein the operations further comprise calling the recipient device at a phone number received from the client device.

17. The system of claim 16, wherein the step of calling is performed over a carrier Public Switched Telephone Network (PSTN) to a Session Initiation Protocol (SIP) network.

18. The system of claim 11, wherein the first part of the data stream contains voice data associated with a phone call between the client device and the recipient device.

19. The system of claim 18, wherein the operations further comprise upgrading the voice data to contain High Definition (HD) voice data based on a signal quality of at least one of the first network connection or the second network connection.

20. The system of claim 18, wherein the operations further comprise upgrading the phone call to a video call based on a signal quality of at least one of the first network connection or the second network connection.

* * * * *